May 2, 1933. W. S. ELTERS 1,906,454
CULINARY TONG
Filed April 4, 1932
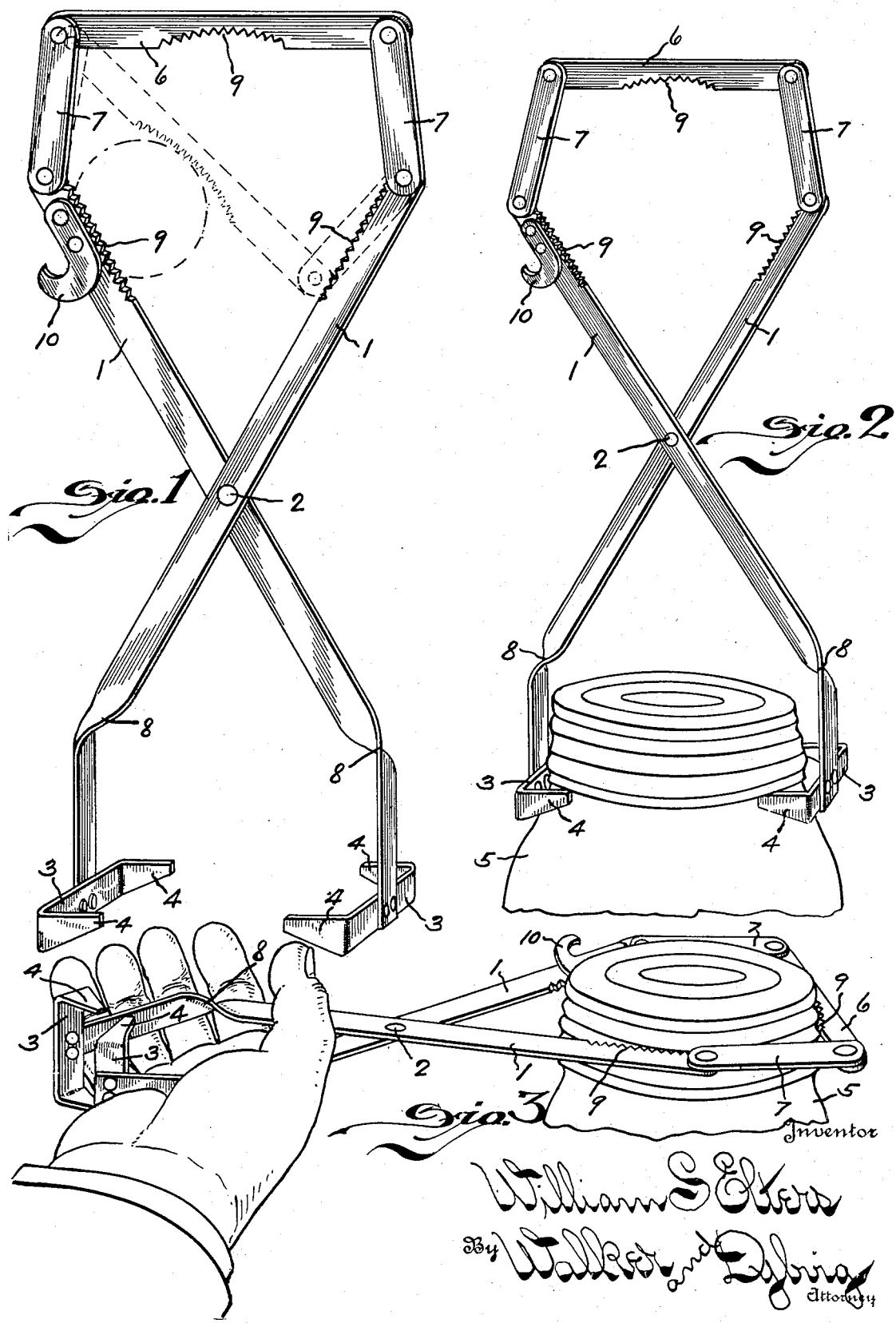

Patented May 2, 1933

1,906,454

UNITED STATES PATENT OFFICE

WILLIAM S. ELTERS, OF DAYTON, OHIO, ASSIGNOR OF ONE-HALF TO JOHN E. LEDGER, OF DAYTON, OHIO

CULINARY TONGS

Application filed April 4, 1932. Serial No. 603,059.

This invention relates to article grasping and lifting implements, and more particularly to a pair of tongs for household and culinary use which are especially useful for lifting hot jars and other vessels when "cold packing", and for other analogous purposes.

The object of the invention is to prove the construction as well as the means and mode of operation of tongs for household purposes whereby they will not only be cheap in construction, and capable of being economically manufactured, but will be more efficient in use, positive in action, of light weight and unlikely to get out of repair.

A further object of the invention is to provide a grasping and lifting implement which will securely engage and hold round vessels as well as other shapes, and which will be unlikely to slip or accidentally release the engaged articles.

A further object of the invention is to provide an implement engageable with jars, bottles, cups or other vessels by which they may be lifted either vertically or horizontally. Such adaptability to different conditions and operations is especially advantageous in the "cold pack" method of canning wherein the contents of jars packed with vegetables or fruit are sterilized by being submerged in boiling water from which they must be withdrawn vertically, or as an alternative method, the jars of vegetables or fruits are heated in an oven from which they must be lifted horizontally.

A further object of the invention is to provide adjusting means for one hand operation of the tongs whereby they may be easily and readily opened and closed, and whereby the weight of the suspended article or vessels will tend to increase the gripping engagement of the device.

A further object of the invention is to provide gripping levers which will be of light weight and minimum cross sectional area but which will be quite stiff and rigid, portions of which are shaped to provide comfortable hand grasping surfaces.

A further object of the invention is to provide an improved form of grasping heads for the tongs.

A further object of the invention is to increase the range of adaptability and usefulness of the implement by providing means whereby it may be used as a wrench for removing screw type jar tops, and for removing the clenched type of jar and bottle caps.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawing wherein is shown the preferred, but obviously not necessarily the only form of embodiment of the invention, Fig. 1 is a perspective view of the implement forming the subject matter hereof. Fig. 2 is a perspective view illustrating the tongs applied to a conventional type of fruit jar for lifting the jar vertically. Fig. 3 is a perspective view of the device applied to a jar for lifting it horizontally.

Like parts are indicated by similar characters of reference throughout the several views.

While the implement is illustrated as applied to a conventional form of jar, it is to be understood that it is not limited to such use but may be utilized for grasping and lifting other articles such as ear corn, meat, or even ice.

The implement comprises a pair of transversely disposed levers 1—1 interpivoted at 2. Each of the levers is provided at one end with an article grasping head comprising a cross arm 3 bent to a substantially angular U shape, the fingers 4 of which are directed inwardly toward the corresponding head of the opposite lever, and are tapered. The fingers 4 extending in parallel spaced relation engage a round or curved body such as the jar 5 in a straddle relation in planes at opposite sides of its maximum diameter rical plane and hence are unlikely to slip off the article laterally.

The opposite ends of the levers 1—1 which are flat and of relatively thin, light-weight material, are interconnected by a three-member toggle comprising a longer medial link 6 and two shorter links 7—7 pivotally connecting the ends of the medial link 6 with the ends of the levers 1—1. Thus the medial link 6 at all times occupies a position perpendicular to the bisector of the angle formed by the levers 1 and substantially forms therewith an isosceles triangle, the base angles of which are truncated by the links 7.

The medial link 6 affords a handle for the implement and by its movement toward and from the pivotal point 2 it enables the tongs to be opened and closed by one hand operation.

The article being lifted and the lifting tongs being suspended by the links 7 from the handle bar or link 6, the weight of the article tends to retract the levers and so increase the gripping engagement of the U-shaped heads with the article.

The insertion and removal of vessels, jars and the like into and from a hot oven must be accomplished by reaching horizontally into the oven. By reversal, the present implement may be employed for such purpose, in which event the interconnected arms of the levers 1—1 and the connecting links 6 and 7 form a contractible and extensible loop which may be positioned around the jar or other article and contracted tightly thereabout by squeezing together the opposite ends of the levers 1—1. These levers being thin and flat operate edgewise and are hence quite stiff. The levers are twisted however at 8 adjacent to the grasping heads 3 thereby presenting the flat surfaces of short portions of the levers outwardly for comfortable grasping within the hand of the operator as is shown in Fig. 3.

To enable the implement to be employed as a wrench for tightening and for releasing tight screw-top jars, the inner margins of the arms of the levers interconnected by the links 6 and 7 and also the inner margin of the link 6 are serrated as at 9. The jar top is engaged within the loop for such purpose just as the article or jar is engaged for lifting, as shown in Fig. 3.

As may best be seen in Fig. 1, the link mechanism, forms a loop in extended position as disclosed by the full line position, and a folded position as disclosed in the dot-dash position and indicated by 6' and 7'. The loop may be used as a wrench for tightening and for releasing tight screw top jars in either position. The wrench responds in either position to movements of the levers.

From the foregoing description it is apparent that the loop when in the full line position is capable of engaging a larger cap than when in the folded position.

As a matter of convenience a hooked finger or claw 10 is secured to one of the levers 1 for use in prying or lifting clenched type caps from jars and bottles.

The device is of general adaptability for household purposes and affords a convenient and safe means for lifting hot jars, vessels, meats and vegetables.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. Lifting tongs comprising a pair of interpivoted flat levers, substantially U-shaped inwardly directed heads carried at corresponding ends of the levers, the levers being twisted adjacent to the heads to present outwardly directed flat surfaces, and a series of three interpivoted links pivotally interconnecting the opposite ends of the levers, the inner margins of the interconnected lever arms and the inner margin of the intermediate link connecting said lever arms being serrated.

2. Lifting tongs including a pair of transversely disposed interpivoted, flat levers, a succession of interpivoted links interconnecting corresponding ends of the interpivoted levers and forming therewith a flexible loop within which an article may be engaged, said loop being expansible and contractible by oscillation of the levers.

3. Lifting tongs including a pair of transversely disposed interpivoted, flat levers, a succession of interpivoted links interconnecting corresponding ends of the interpivoted levers and forming therewith a flexible loop within which an article may be engaged, said loop being expansible and contractible by oscillation of the levers, said levers being twisted adjacent to their ends opposite those connected by the links, to present outwardly directed, flat faces for convenient grasp within the hand of the operator.

4. A reversible household implement including a pair of transversely disposed interpivoted levers, a contractible and expansible loop formed at one end of the levers and coacting gripper heads formed at the opposite ends of the levers, to both of which article engaging means the levers are common and operative by like contractive movement to hold an article engaged either within the loop or between the heads.

5. An implement for household use including a pair of transversely disposed interpivoted levers, a succession of interpivoted links interconnecting corresponding ends of the levers and forming therewith a flexible loop, the loop having extended and folded positions for engaging articles of different sizes, said loop being expansible and contractible in either position by the oscillation of the levers for engaging an article.

6. An implement for household use including a pair of transversely disposed interpivoted levers, a plurality of link members interconnecting corresponding ends of the levers and forming therewith a flexible loop having extended and folded positions, the extended loop enclosing a larger area than the folded loop, whereby articles of various sizes may be handled.

7. An implement for household use including a pair of transversely disposed interpivoted flat levers, a succession of interpivoted links interconnected to the corresponding ends of the levers, cooperating to form a closed loop having extended and folded positions in either of which an article may be engaged, said loop being expansible and contractible in either position to grip an article, said levers being twisted adjacent to their opposite ends to present flat faces for convenient grasp within the hand of the operator.

8. An implement for household use including a pair of transversely disposed interpivoted levers, a succession of interpivoted links interconnecting corresponding ends of the levers and forming therewith a closed loop having extended and folded positions, the loop in either position being expansible and contractible by the oscillation of the levers so as to grip an article.

9. An implement for household use including a pair of transversely arranged interpivoted levers, and means carried by said levers forming a closed loop having extended and folded positions, in either of which the loop engages an article in response to oscillations of the levers.

In testimony whereof, I have hereunto set my hand this 28th day of March, A. D. 1932.

WILLIAM S. ELTERS.